United States Patent [19]

Faryar et al.

[11] Patent Number: 5,363,141
[45] Date of Patent: Nov. 8, 1994

[54] METHOD AND APPARATUS FOR TRANSMITTING ENCODED BLOCKS OF VIDEO SIGNALS AT DIFFERENT CHANNEL RATES

[75] Inventors: Alireza F. Faryar, Shrewsbury; George J. Kustka, Marlboro; John N. Mailhot, Somerville; Charles A. Webb, III, Rumson, all of N.J.

[73] Assignee: AT&T Bell Laboratories, Murray Hill, N.J.

[21] Appl. No.: 10,893

[22] Filed: Jan. 29, 1993

[51] Int. Cl.⁵ .................................................. H04N 7/13
[52] U.S. Cl. ..................................... 348/470; 348/471; 348/437; 375/34
[58] Field of Search ............... 358/141, 140, 142, 11, 358/12, 133, 135, 136, 13; 375/39, 34, 42, 58; 370/18, 21; 348/426, 429, 437, 438, 470, 471; H04N 7/08, 7/04, 7/12, 7/13

[56] References Cited

U.S. PATENT DOCUMENTS 5,105,442 4/1992 Wei ........................................ 375/39
5,128,756 7/1992 Johnston ............................. 358/133
5,164,963 11/1992 Lawrence ............................ 375/39
5,243,419 9/1993 Faryar et al. ........................ 358/133

Primary Examiner—James J. Groody
Assistant Examiner—Michael H. Lee
Attorney, Agent, or Firm—Michele L. Simons

[57] ABSTRACT

Encoded blocks of video information are selected for transmission at a plurality of channel rates based on the corresponding location of the portions of the video image represented by the encoded blocks. Each encoded block is designated an image type which determines its transmitted channel rate. The image types are associated with spatial positions of a video image such that encoded blocks within a first area of the video image are designated a first image type and encoded blocks within a second area of the image are designated a second image type. In general, data blocks representing the central portion of the video image are transmitted at a channel rate having less susceptibility to noise or other degradation, thereby ensuring that such portion can be received in fringe areas.

20 Claims, 3 Drawing Sheets

METHOD AND APPARATUS FOR TRANSMITTING ENCODED BLOCKS OF VIDEO SIGNALS AT DIFFERENT CHANNEL RATES

FIELD OF THE INVENTION

This invention relates to a scheme for transmitting a video image in encoded data blocks wherein the channel rate for transmitting each block is based on the location of the portion of the image encoded by such block.

BACKGROUND OF THE INVENTION

Transmission of video signals over significant distances is limited by broadcast transmission range. Depending on the communication method, video signals experience different types of degradation. Some video signals, such as NTSC (National Television System Committee) signals, experience graceful degradation so that viewers on the "fringe" of a viewing area receive a "fuzzy" but viewable picture. Particularly in all-digital transmission systems, signal degradation occurs at the fringe of the viewing area due to the sensitivity of digital transmission to small variations in the signal-to-noise ratio. When the signal-to-noise ratio falls below a particular threshold, there can be significant signal degradation resulting in loss of picture for up to several seconds, which is generally not considered acceptable by the broadcast industry.

Attempts have been made to increase the viewing area of video transmissions by decreasing sensitivity to noise. A number of commonly assigned United States patents disclose various techniques that provide graceful degradation in the reception quality at a TV set location for digital television signals. These are V.B. Lawrence et al. entitled "Coding for Digital Transmission," U.S. Pat. No. 5,164,963 (Nov. 17, 1992); L.-F. Wei entitled "Coded Modulation with Unequal Error Protection." U.S. Pat. No. 5,105,442 (Apr. 14, 1992); and Johnston et at. entitled "A High Definition Television Coding,; Arrangement with Graceful Degradation", U.S. Pat. No. 5,128,756. In addition, u co-pending commonly assigned U.S. Patent application of H.Y. Chung et al. entitled "Multiplexed Coded Modulation with Unequal Error Protection," Ser. No. 07/627.156, filed on Dec. 13, 1990 discloses a technique for providing graceful degradation in reception quality. However, the techniques of these patents and the patent application attempt to protect partial picture quality over the entire screen. In these schemes data protection is applied to the more important components of the compressed data.

One approach to decreasing the effects of signal degradation at the fringe of the viewing area is to transmit the more important data at a different channel rate from the less important data. The me, re important data are transmitted at a channel rate having less susceptibility to noise or other degradation. The resulting combination of video transmissions allows a more graceful degradation at the video receiver since the less important data will be affected first. Such an approach is described in co-pending, commonly assigned United States patent application of A.F. Faryar et. al. entitled "Soft Coding for HDTV", Ser. No. 07/785,671 filed on Oct. 31, 1991, now U.S. Pat. No. 5,243,419. While the general concept of classifying the data blocks of a video signal into different categories as described in tile Faryar reference is an advantageous technique, it is still necessary to select the categories to be transmitted at the various channel rates. One method described in Faryar is to classify the data blocks in accordance with the number of motion-vector bits.

SUMMARY OF THE INVENTION

In accordance with the invention, a method and apparatus tire realized for transmitting encoded blocks of video signal information at different channel rates based on the locations of the portions of the image :represented by the encoded blocks. The encoded blocks representing the most preferred portion of the image, for example, the central portion, are transmitted at the channel rate least susceptible to degradation.

The encoded blocks are transmitted in the form of data segments containing data from one or more encoded blocks. If a data segment contains data for encoded blocks from more than one portion of the image, such data segment is transmitted at the channel rate associated with the most preferred portion. Encoded blocks can have variable amounts of data, such as in systems m which the video signal information is compressed.

These and other aspects of the invention will become apparent from the following specification and attached drawings.

DETAILED DESCRIPTION

Figure 1:
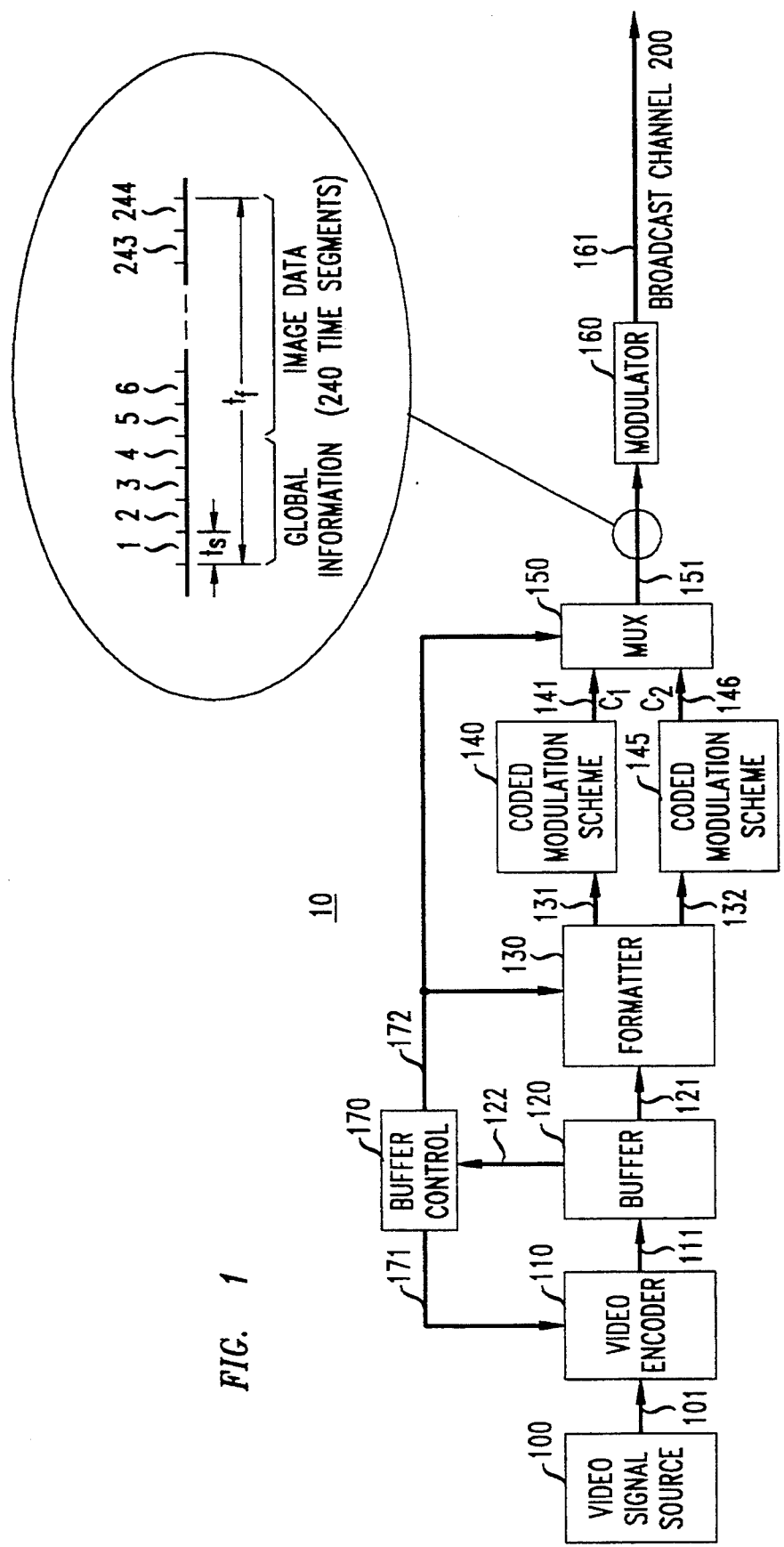
FIG. 1 is a block diagram of a video transmitter embodying the principles of the invention.

Referring to the drawings there is shown in FIG. 1 a transmitter 10 which implements the spatial scheme of the present invention. For the purpose of clarity of explanation, the transmitter 10 described is of a type in which a video signal is compressed and encoded such as in a high-definition television (HDTV) system. However, it is to be understood by those skilled in the art that the transmitter 10 can be any suitable type of transmitter in which a video signal is digitally encoded into data blocks such as, but not limited to, a broadcast transmitter, a cable transmitter or a satellite transmitter, without departing from the scope and spirit of the present invention.

A video signal source 100 generates a video signal, for example, an HDTV signal, which comprises a sequence of image frames (hereinafter simply referred to as an image sequence). The image sequence is applied to a video encoder 110 which, in the case of an HDTV signal, compresses each image frame in the sequence and provides a corresponding compressed image frame on output lead 111. If the video signal is not to be compressed, video encoder 110 can be eliminated. In the case of compression, it is to be understood by those skilled in the art that the video encoder 110 can employ any of the well-known techniques for video compression such as, but not limited to, discrete cosine transform, quantization, Huffman coding and/or motion compensated predictive coding. An example of motion compensated predictive coding is shown in the Johnston patent '756 (mentioned above).

In systems in which the video signal is compressed, the amount of picture information, or data, contained in each compressed image frame can depend on the complexity of the image frame and, as a result, can be variable. For example, in motion compensated predictive encoding, the compressed image frame depends on the current and previous image frames, i.e., the image sequence, and the desired level of picture quality. Assuming a given level of picture quality, the size of the compressed image frame, will be smaller if the image sequence is an "easy" sequence than if the image sequence is a "difficult" sequence. An easy sequence results, for example, from a stationary camera pointed at a wall, while a difficult sequence results when the camera faces a moving car. Since a video compression scheme typically removes redundant information, it can be conceptually appreciated that the image sequence representing the stationary wall has more redundant information, which can be removed - hence making it an easy sequence, unlike the image sequence representing the moving car.

Figure 2:
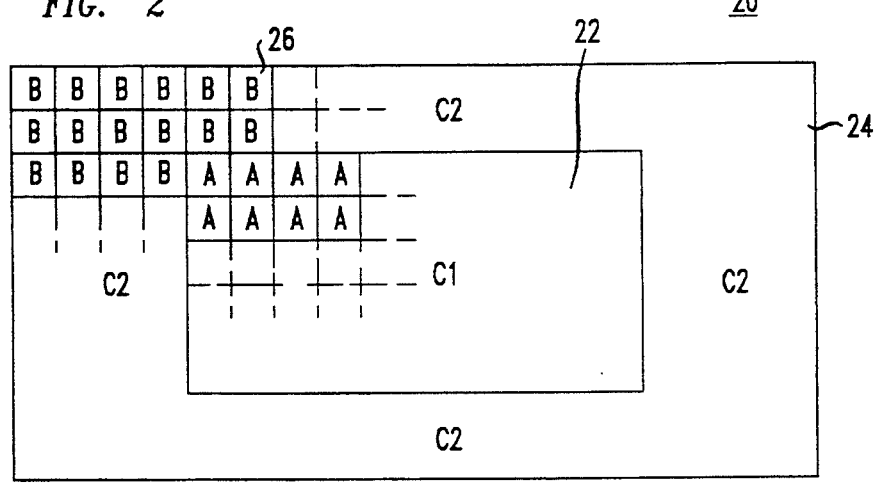
FIG. 2 is an illustrative diagram of a spatially subdivided video frame.

Typically, difficult image sequences are located within the central portion of the image frame. As shown in FIG. 2, a first area or center portion 22 of an image frame 20 can be designated as a first image type (A) and a second area or border portion 24 of the image frame as a second image type (B). The information identified in the first image type (A) can be transmitted at a channel rate ($C_1$) that is less sensitive to noise or other degradation. Information identified in the second image type (B), is transmitted at a channel rate ($C_2$). It is to be understood by those skilled in the art that the image frame 20 can be divided in any suitable manner such as, but not limited to, dividing the frame into three horizontal or vertical strips. without departing from the scope and spirit of the present invention. It is also to be understood by those skilled in the art that the first area may be varying in size on a frame to frame basis or at any desired rate and time without departing from the scope and spirit of the present invention.

The image frame 20 as a whole is divided into a plurality of generally equally sized image blocks 26, e.g. 48×64 blocks. In general, each image block 26 is assigned an image type which represents the location of the block 26 within the image frame 20, and therefore the channel rate at which the image block 26 will be transmitted. For the sake of example, image blocks 26 in the center portion 22 of image frame 20 are designated as being of a first image type (A) and image blocks 26 located within border 24 are designated as being of a second image type (B). It is to be understood by those skilled in the art that any number of image types may be designated for a given image frame without departing from the scope and spirit of the present invention. The subdivision of the image frame 20 ensures that viewers located in the portion of the transmission range where only $C_1$ signals can be received will be able to view the video information of the first image type (A) without degradation. Those viewers located within the transmission range where $C_2$ signals can also be received will be able to receive video information from both image types without degradation.

Figure 3:
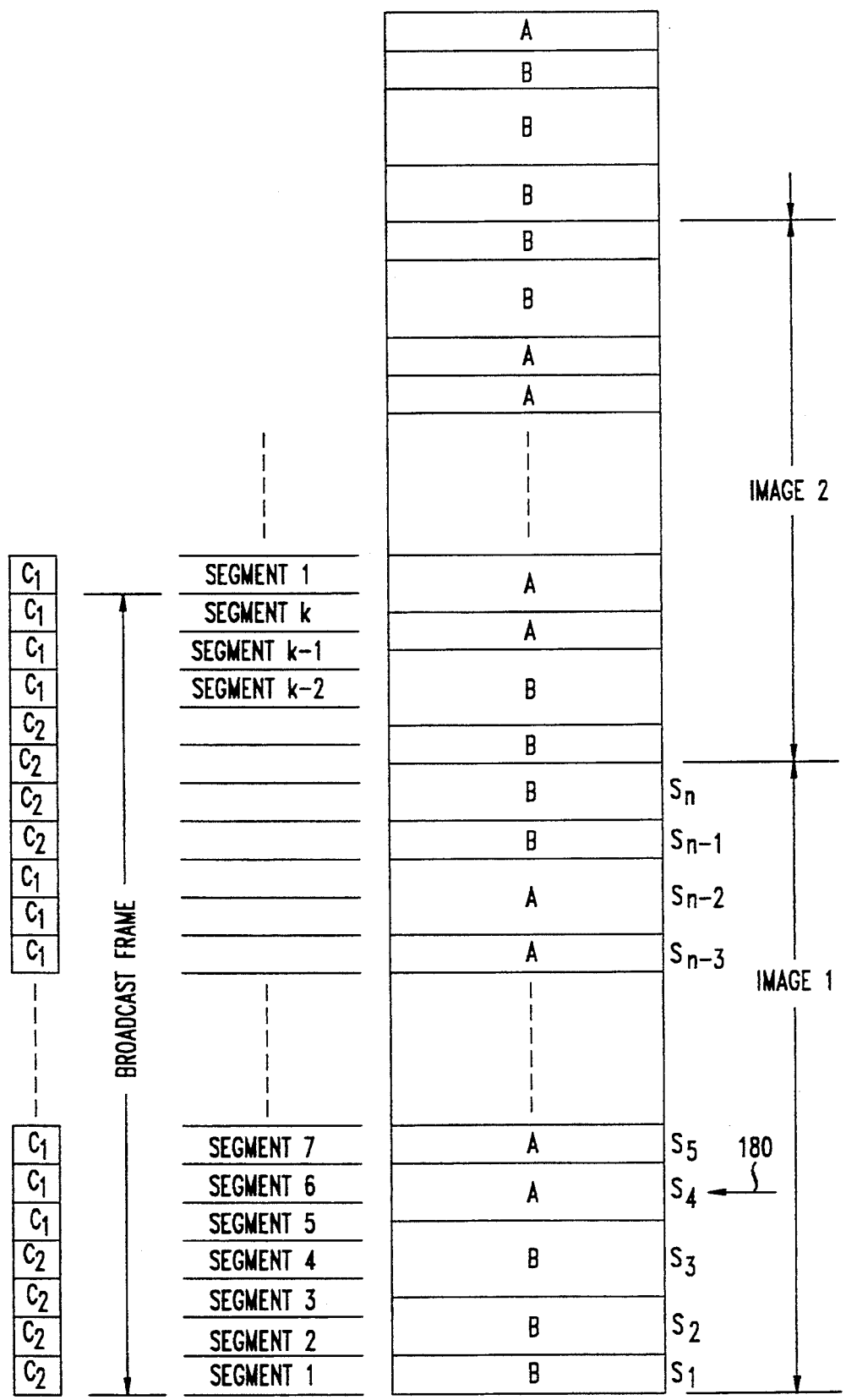
FIG. 3 is a diagram of a data buffer showing various relationships.

Referring back to FIG. 1, since the amount of data provided by video encoder 110 varies, the video encoder output 111 is applied to buffer 120, which isolates the remainder of the transmitter circuitry from the variable output data rate of video encoder 110. Buffer 120 accepts picture information from video encoder 110 in encoded blocks of data, which may vary in size, and stores those blocks in order. This is illustrated in FIG. 3 which depicts buffer 120, where block $s_1$ contains less video information than block $s_2$. Buffer 120 is, in effect, a FIFO memory with arrow 180 marking the last memory location in buffer 120 from which data was extracted. That is, in the illustration of FIG. 3, arrow 180 specifies that the picture of blocks $s_1$, $s_2$, $s_3$ and a portion of block $s_4$ have been previously extracted from buffer 120. Picture information is extracted from buffer 120 in data segments of fixed size, e.g., data segment 1, data segment 2, ..., data segment K.

Referring back to FIG. 1, the data is broadcast over channel 200 in "broadcast frames", such as NTSC frames. In the illustrative embodiment described herein, each broadcast frame is divided into 244 time segments as shown graphically in FIG. 1 in association with lead 15 1. Up to four of the time segments are devoted to global information (described in more detail below) and the remaining 240 time segments are devoted to image data. Since the transmission rate of broadcast channel 200 is fixed, the number of symbols that are transmitted during each time segment is also fixed. A "symbol" is a binary representation of a discrete event which occurs during the encoding process and is a term of art commonly used in pulse modulation systems. The number of bits represented by each symbol depends on the channel rate. For example, channel rates $C_1$ and $C_2$ can transmit one bit per symbol and two bits per symbol, respectively.

Because of the different channel rates $C_1$ and $C_2$, the number of symbols transmitted over broadcast channel 200 during one broadcast frame does not correspond to the number of bits stored in buffer 120 for one image frame 20. Moreover, as described above, the amount of video information that video encoder 110 produces for each image frame 20 can vary. Consequently, there is no synchronization between image frames 20 and the broadcast frames, nor between image frames 20 and the data segments. This is depicted in FIG. 3 by the demarcation marks for image frames, broadcast frames and data segments. Of course, on avenge, the amount of data in the image frames cannot exceed the amount of information in the broadcast frames.

Since the broadcast frame period, t f, corresponds to an NTSC frame rate, there is time during the vertical retrace period to perform the calculations necessary for determining the amount of data that will be retrieved from buffer 120 during the next broadcast frame. Alternatively, buffer 120 may be designed to be large enough so that a one-frame delay or larger may be permitted. By allowing buffer 120 to contain more information, the calculations for the next broadcast frame can always be carried out while the current frame is being delivered from buffer 120. In the following discussion, the latter approach is assumed. Thus, buffer 120 provides each data segment to formatter 130. The latter, in response to buffer control 170, via lead 172, formats the data blocks in each image frame for transmission in each broadcast frame. In accordance with the invention, as discussed in detail below, buffer control 170, via lead 172, allocates each data segment to either coded modulation scheme 140 or coded modulation scheme 145. Coded modulation schemes 140 and 145 use any of the well-known channel coding schemes, e.g., trellis-coding, and provide a sequence of symbols on leads 141 and 146 at channel rates $C_1$ and $C_2$ respectively.

In accordance with the illustrative embodiment of the invention, data is sent during time segments at either $C_1$ or $C_2$. A time segment during which data is being sent at $C_2$ extracts twice as many bits of information from buffer 120 as a time segment during which data is sent at $C_1$. Stated conversely, twice as many time segments are needed when data is sent at $C_2$ than when data is sent at $C_1$. Data from buffer 120 is retrieved in order. Accordingly, one data segment (beginning with, perhaps, a portion of an encoded block, continuing with the following few blocks, and terminating, perhaps, with a portion of another block) may be sent at $C_1$ while the next data segment is sent at $C_2$.

To limit the number of bits needed in the global information, data segments that are sent at rate $C_2$ are sent in pairs (the "pair rule"). Stated in different words, the sequence of transmissions may have an odd number of contiguous data segments sent at $C_1$ but must have an even number of contiguous data segments sent at $C_2$.

FIG. 3 shows the relationship between encoded data blocks and data segments and how the pair rule is used. As discussed above, each broadcast frame contains 240 time segments used for transmitting image data. In any broadcast frame $t_f$, $N_A$ of the data segments are transmitted at $C_1$, with each of the $N_A$ data segments being transmitted in 2 time segments. Consequently, the number of remaining data segments transmitted at $C_2$, $N_B$, is equal to:

$$N_B = 240 - 2N_A, \text{ where } (0 \leq N_A \leq 120).$$

As a result, the total number of data segments sent in any time frame $t_f$ is:

$$N_A + N_B = N_A + (240 - 2N_A) = 240 - N_A.$$

Each data segment is filled with as many bits of data from the encoded data blocks as possible. Therefore partial blocks or multiple blocks of data may be transmitted in each data segment. Each block is encoded in the global information with an assigned image type based on the spatial location of the portion of the video image represented by the information contained within the particular data block as discussed above.

The encoded data block for each image block 26 is transmitted to buffer 120 together with its encoded image type. Referring to FIGS. 2 and 3, image blocks 26 of the first image type are labeled A and image blocks of the second image type are labeled B. In order to comply with the pair rule discussed above, the image types of the data blocks in each pair of data segments must be determined before the channel rate for each data segment in the pair can be determined. If a data block of image type A appears in a data segment, the data segment is sent at channel rate $C_1$. If a data segment only contains data blocks of type B, the next data segment must also contain only data blocks of type B for the data to be sent at channel rate $C_2$.

Figure 4:
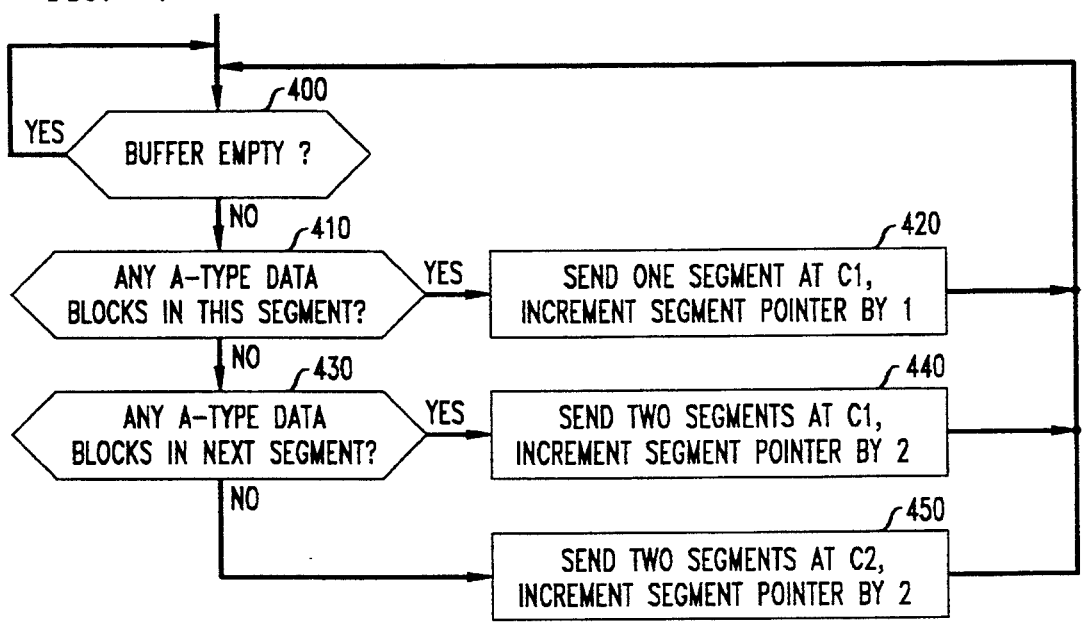
FIG. 4 is an illustrative flow chart of the manner in which the transmission mode of FIG. 3 is determined.

FIG. 4 is a flow chart that generally depicts how the transmission mode is selected for each data segment. If buffer 120 is not empty (step 400), the first data segment is tested to determine whether any A-type data blocks are present (step 410). If so, the segment is transmitted at channel rate $C_1$ and the segment pointer is incremented by one segment (step 420). If there are no A-type data blocks in the first data segment, the next data segment is tested for A-type data blocks (step 430). If the next segment contains A-type data blocks, both data blocks are transmitted at channel rate $C_1$ and the segment pointer is incremented by two segments (step 440). If there are no A-type blocks in either segment, then both segments are transmitted at channel rate $C_2$ and the segment pointer is incremented by two segments (step 450). These steps are repeated for all the segments in a broadcast frame.

Applying the method of FIG. 4 to the data blocks shown in FIG. 3, each data segment is analyzed to determine the image type of each data block contained within. Data segment 1 contains data block $s_1$ which is image type B. In order to comply with the pair rule, the next data segment must also contain data blocks of image type B for the data to be sent at channel rate $C_2$. As shown, data segment 2 contains a portion of data block $s_2$ which is of image type B. Therefore the first two data segments are transmitted at channel rate $C_2$ as indicated at the left in FIG. 3.

Next, the following two data segments (3,4) are analyzed. Data segment 3 contains portions of data blocks $s_2$ and $s_3$ which are both of image type B. Data segment 4 also contains a portion of data block $s_3$. Therefore, since data segments 3 and 4 both contain data blocks of type B, they are both transmitted at channel rate $C_2$. The next pair of data segments (5,6) are then analyzed. Data segment 5 contains a portion of data block $s_3$ which is of type B and a portion of data block $s_4$ which is of image type A. Since data segment 5 contains an A type data block, it is transmitted at channel rate $C_1$.

As a result, the next pair to be analyzed are data segments 6 and 7. As can be seen, both data segments 6 and 7 contain data blocks of type A and are therefore sent at channel rate $C_1$. This type of analysis is repeated for each data segment within each broadcast frame.

Referring back to FIG. 1, formatter 130 provides information to the "global information field" that is transmitted in the first four time segments of a broadcast frame. This information is sent at channel rate $C_1$. This global information field contains information relative to the particular broadcast frame being sent, e.g., what channel rate is assigned to each time segment, information on how to reconstruct the compressed image frame from the received data segments (as mentioned above, the boundaries of a compressed image frame may not coincide with the data segment boundaries), and may include other information as to the transmission format of the overall video signal. In particular, information as to the rate assigned to the time segments is contained within a "mask" comprising 120 bits, where each bit corresponds to a pair of time segments, with each respective bit indicating the corresponding channel encoder used for that pair of time segments. The need of only 120 bits in the mask is a direct consequence of the decision to send $C_2$ time segments in pairs.

The coded modulation scheme outputs, on leads 141 and 146, are applied to multiplexer (mux) 150, which is responsive to buffer control 170, via lead 172, to provide a sequence of symbols to modulator 160. The latter is representative of conventional modulation circuitry for transmission of the broadcast video signal on broadcast channel 200. In a system in which video information is compressed, buffer control 170 monitors the fullness of the buffer and controls the number of bits produced by video encoder 110 based on its buffer fullness determination. If the buffer is too full, the number of bits transferred per data block is decreased, thereby increasing the coarseness of the image being transmitted. If the buffer is relatively empty the number of bits per data block can be increased, thereby decreasing the coarseness of the image being transmitted.

Figure 5:
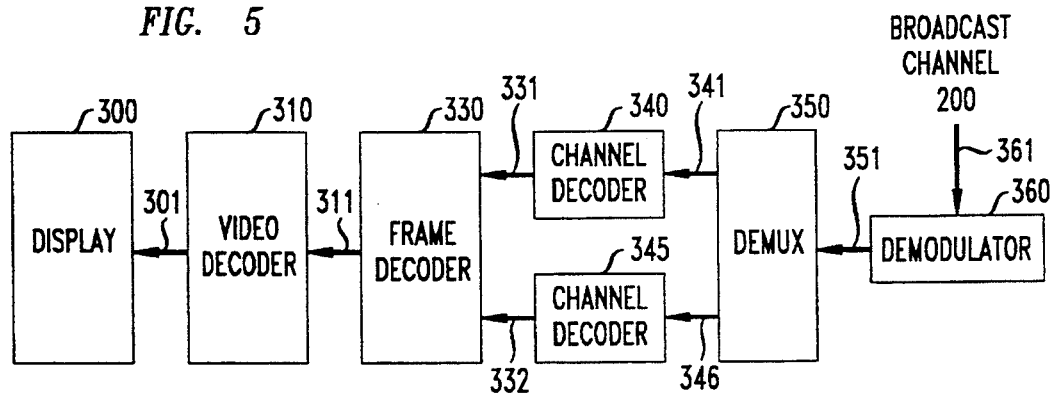
FIG. 5 is a block diagram of a video receiver in accordance with the invention.

The broadcast video signal is received from broadcast channel 200 by receiver 30, which is shown in FIG. 5. The broadcast signal is received by demodulator 360, which contains conventional synchronization, reception and demodulation circuitry. Demodulator 360 provides controls and a time-multiplexed digital signal representing the received coded outputs on lead 351, which is processed by demultiplexer (demux) 350 to provide separate received coded outputs. In the beginning of each time frame t f (derived from control signals supplied by 360), demux 350 receives the global information field and, based on the mask information, allocates segments to either line 341 or to line 346. The received coded outputs at rate $C_1$, representing the A type data, are provided to channel decoder 340 and the received coded outputs at rate $C_2$ representing the B type data, are provided to channel decoder 345. Channel decoders 340 and 345 decode the received coded outputs to provide the A type and B type information to frame decoder 330 via leads 331 and 332, respectively. Frame decoder 330 recombines the data segments sent in a particular frame and provides the data segments to video decoder 310, which provides the inverse function of video encoder 110 of video transmitter 10, to provide the received video signal to display 300.

The foregoing merely illustrates the principles of the invention and it will thus be appreciated that those skilled in the art will be able to devise numerous alternative arrangements which, although not explicitly described herein, embody the principles of the invention and are within its spirit and scope.

In addition, although the invention is illustrated herein as being implemented with discrete functional building blocks, e.g., buffers, formatters, etc., the functions of any one or more of those building blocks can be carried out using one or more appropriate programmed processors.

We claim:

1. Apparatus for transmitting signals representing a video image, comprising:
    means for encoding said signals into data blocks;
    means for assigning a first channel rate having a lower susceptibility to degradation to data blocks encoding portions of said video image located in a first area of said image and a second channel rate having a higher susceptibility to degradation to data blocks encoding a second area of said video image;
    means for transmitting each data block at its assigned channel rate;
    means for assigning the same channel rate to successive data blocks located in the same portion of the video image.

2. The apparatus of claim 1 wherein said means for encoding further comprises:
    means for compressing said video signal.

3. The apparatus of claim 1 wherein a given data block can encode portions of both said first area and said second area and said assigning means further comprises:
    means for assigning said first channel rate to any data block encoding any of said first area and said second area and said second channel rate to any data block encoding only said second area.

4. The apparatus according to claim 3, wherein said first area is located in a generally central portion of said video image.

5. The apparatus according to claim 1, wherein said encoding means further comprises means for designating an image type for each encoded data block based on the location of the portion of the video image encoded by the data block.

6. The apparatus according to claim 5, wherein said assigning means further comprises means for assigning a channel rate to each encoded data block in accordance with said designated image type for such encoded data block.

7. The apparatus according to claim 6 further comprising means for formatting the image type assigned to each encoded data block into a mask which is transmitted with tile data blocks.

8. The apparatus according to claim 1 further comprising formatting means for formatting the channel rate assigned to each encoded data block into a mask which is transmitted with the data blocks.

9. A method of transmitting signals representing a video image comprising:
    encoding said signals into data blocks,
    identifying the location of the portion of the video image represented by the encoded block,
    determining whether the location is within a first area of the video image,
    assigning the encoded block a first channel rate if the block is within the first area,
    assigning the encoded block a second channel rate if the block is not within the first area,
    transmitting each encoded block at its assigned channel rate;
    transmitting successive data blocks located in the first area of said video image at said first channel rate; and
    transmitting successive blocks not within said first area at said second channel rate.

10. The method according to claim 10, wherein the first channel rate has a lower susceptibility to degradation than said second channel rate.

11. The method according to claim 11, wherein each encoded block comprises a compressed video signal.

12. The method according to claim 11, wherein said step of assigning a channel rate to each encoded block further comprises the steps of:
    designating a data block as a first image type if the data block is located within a first designated area of the image; and
    designating a data block as a second image type if the data block is located within a second designated area of the image.

13. The method according to claim 12, further comprising the step of: grouping one or more full or partial data blocks into a data segment.

14. The method according to claim 13, wherein the step of transmitting each data block at its assigned channel rate further comprises the step of:
    transmitting data segments containing at least a portion of one data block of the first image type at a first channel rate; and
    transmitting data segments only containing data blocks of the second image type at a second channel rate.

15. The method according to claim 14, wherein said first channel rate has a lower susceptibility to degradation than said second channel rate.

16. Apparatus for use in a video system in which signals representing a video image are encoded into data blocks, a channel rate being assigned to each data block as a function of the location of the portion of the video image encoded by said data block, the same assigned channel rate being assigned to successive data blocks located in the same portion of the video image, said apparatus comprising:
   means for receiving each successive data block at the assigned channel rate;
   means for recombining said data blocks to form said video image, and
   means for displaying said video image.

17. The apparatus according to claim 16 wherein data blocks located within a first area of the video image are assigned a first channel rate and data blocks located within a second area of the video image are assigned a second channel rate.

18. The apparatus according to claim 17 wherein the first area is a generally central portion of the video image.

19. The apparatus according to claim 17 wherein said first channel rate has a lower susceptibility to degradation than said second channel rate.

20. The apparatus of claim 16 wherein the channel rates for said data blocks are encoded in a mask transmitted with said data blocks and said receiving means further comprises:
   means for receiving said mask, and
   means responsive to said mask for receiving each data block at its assigned channel rate.

* * * * *